(12) United States Patent
Krefft

(10) Patent No.: US 8,744,410 B2
(45) Date of Patent: Jun. 3, 2014

(54) COMMUNICATION OF POSITION DATA VIA TEXT MESSAGE

(71) Applicant: Carlos Krefft, Miami, FL (US)

(72) Inventor: Carlos Krefft, Miami, FL (US)

(*) Notice: Subject to any disclaimer, the term of this patent is extended or adjusted under 35 U.S.C. 154(b) by 0 days.

(21) Appl. No.: 13/936,059

(22) Filed: Jul. 5, 2013

(65) Prior Publication Data

US 2014/0011476 A1 Jan. 9, 2014

Related U.S. Application Data

(60) Provisional application No. 61/667,986, filed on Jul. 4, 2012.

(51) Int. Cl.
*H04M 1/66* (2006.01)
*H04M 1/68* (2006.01)
*H04M 3/16* (2006.01)

(52) U.S. Cl.
USPC .......................................................... 455/411

(58) Field of Classification Search
USPC .......................................................... 455/411
See application file for complete search history.

(56) References Cited

U.S. PATENT DOCUMENTS

| | | | |
|---|---|---|---|
| 7,184,786 B2 | 2/2007 | Mumick |
| 7,379,743 B2 | 5/2008 | Bostrom |
| 7,966,384 B2 | 6/2011 | Marr |
| 7,996,023 B2 | 8/2011 | McGary |
| 8,004,399 B2 | 8/2011 | Reyes |
| 2004/0062213 A1 | 4/2004 | Koss |
| 2008/0209329 A1 | 8/2008 | DeFranco |
| 2008/0261626 A1 | 10/2008 | Farazmandnia |
| 2009/0228281 A1 | 9/2009 | Singleton |
| 2010/0003946 A1 | 1/2010 | Ray |
| 2010/0003958 A1 | 1/2010 | Ray |
| 2010/0029305 A1 | 2/2010 | Gupta |
| 2010/0039314 A1 | 2/2010 | Gupta |
| 2010/0273450 A1 | 10/2010 | Papineau |
| 2010/0311385 A1 | 12/2010 | Hurwitz |
| 2011/0140962 A1 | 6/2011 | McNamara |
| 2011/0143774 A1 | 6/2011 | McNamara et al. |
| 2011/0208420 A1 | 8/2011 | Chang |

OTHER PUBLICATIONS

"Drive Customers Directly to Your App on the App Store with iTunes Links", Jan. 6, 2010, XP055081337, URL: https: developer.apple.com/news/?id=0106211a.

*Primary Examiner* — Kwasi Karikari
(74) *Attorney, Agent, or Firm* — Mark Terry

(57) ABSTRACT

A mobile application on a mobile computing device connected to a communications network is disclosed. The mobile application includes an initiation module for transmitting a request for a transaction identifier to an application server and receiving a transaction identifier from the server, a request module for transmitting to a second device an SMS message including a URL, a first receiving module for receiving an SMS message and activating a URL embedded in the SMS message, wherein upon activation of the URL, the first receiving module is further configured for transmitting an HTTP request to the server, a processing module for receiving program code from the server and executing the program code configured for reading position data of the device and transmitting the position data and the transaction identifier to the server, and a second receiving module for receiving position data of the second device and displaying the position data.

10 Claims, 5 Drawing Sheets

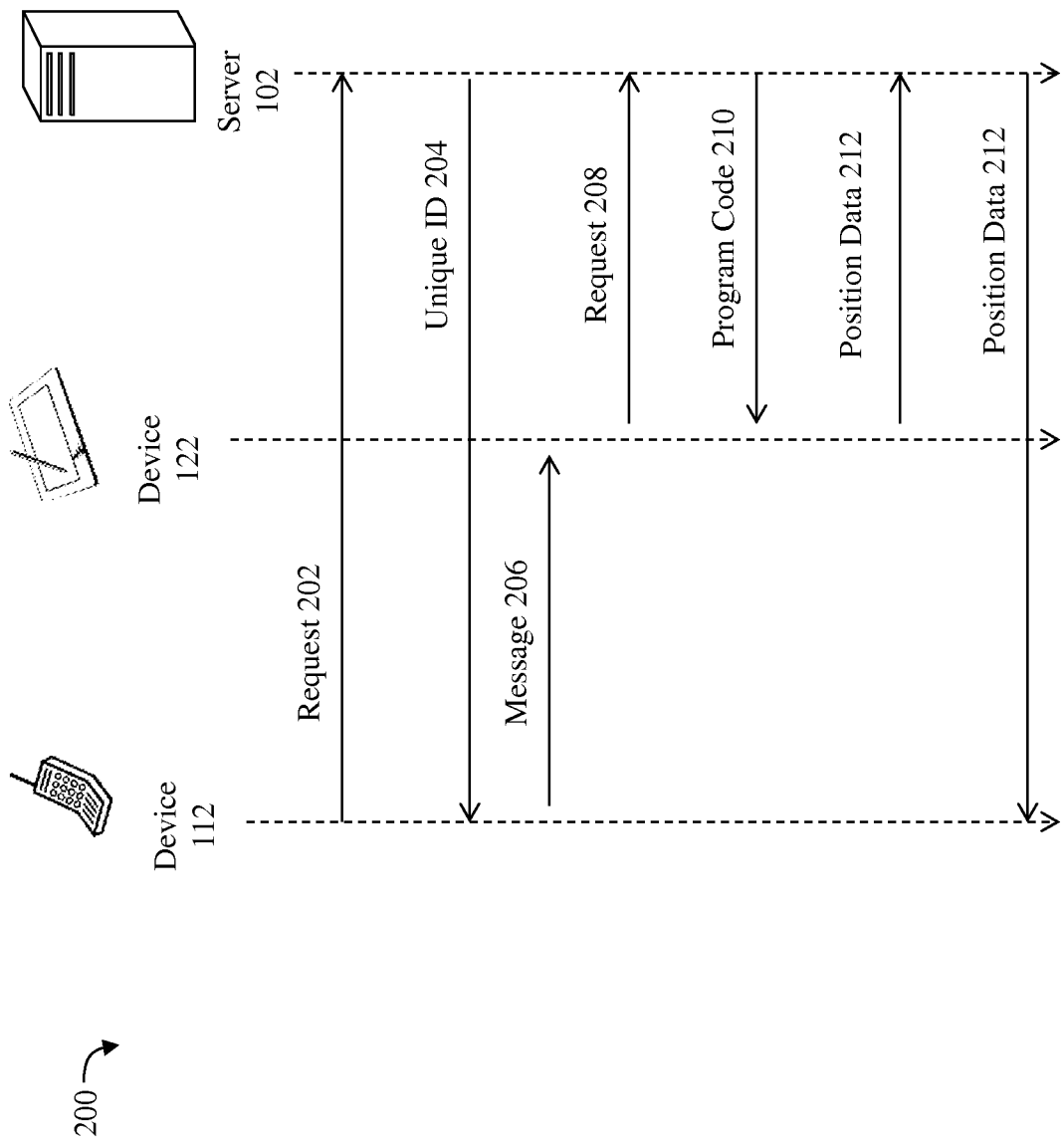

COMMUNICATION OF POSITION DATA VIA TEXT MESSAGE

CROSS-REFERENCE TO RELATED APPLICATIONS

This patent application claims priority to provisional patent application No. 61/667,986 filed Jul. 4, 2012 and entitled "Communication of Position Data Via Text Message." The subject matter of patent application No. 61/667,986 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates generally to the field of telecommunications and, more specifically, the present invention relates to the field of communicating position data over a telecommunications network.

BACKGROUND

Various situations require the communication of position data of an individual or object. Law enforcement, rescue and fire workers, for example, benefit from having headquarters know the current position of each worker and/or vehicle in the field. Highly mobile professionals, such as realtors, general contractors, and electricians, can benefit from having a central know their whereabouts. Entities that historically have workers in the field, such as delivery companies, use the position data of their employees and/or vehicles to estimate delivery or visit times and to keep track of production. Further, individuals can use position data to keep tabs on each other, on children or on elderly family members.

One common problem with the communication of position data, however, is the method by which the position data is communicated. Several commercially available solutions for communicating position data involve the installation and configuration of dedicated servers and/or devices on each individual or vehicle that must be located. This can be costly for the organization and burdensome for the individuals who are required to carry an additional device, thereby adding weight. Other solutions for communicating position data involve a user downloading and installing a standalone software application on a mobile computing device, and then interacting with the software application on the mobile computing device in order to communicate their position data. This approach can be onerous and time consuming for the individual, since it requires the individual to open the mobile computing device, launch the software application, wait for the software application to load and then interact with the software application to communication position data. This solution is not compatible with the fast pace of society today.

Yet another problem with current solutions for communicating position data involves accuracy. Certain situations call for a more precise or accurate position data reading, but current solutions for communicating position data do not allow for the customization of the desired precision or accuracy of the position data. This limits the usability and application of current approaches to communicating position data.

Therefore, what is needed is a system and method for improving upon the problems with the prior art, and more particularly for a more efficient, accurate and user-friendly way of communicating position data over a communications network.

SUMMARY

A method, system and computer program product that facilitates the communication of position data over a communications network is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a mobile application on a mobile computing device connected to a communications network, is provided that solves the above-described problems. The mobile application includes an initiation module for transmitting a request for a transaction identifier to an application server over the communications network and, responsive to said request, receiving a transaction identifier from the application server; a request module for transmitting to a second mobile computing device an SMS message, including a URL containing the transaction identifier, over the communications network; a first receiving module for receiving an SMS message and activating a URL embedded in the SMS message in response to a user command, wherein upon activation of the URL, the first receiving module is further configured for transmitting an HTTP request, including the transaction identifier, to the application server over the communications network, a processing module for receiving program code from the application server via HTTP, responsive to said HTTP request, and executing the program code, which is configured for reading position data of the mobile computing device and transmitting the position data and the transaction identifier to the application server via HTTP over the communications network; and a second receiving module for receiving position data of the second mobile computing device and displaying the position data.

In another embodiment, application executing on an application server connected to a communications network, is provided that solves the above-described problems. The application includes a first module for receiving a request from a first mobile computing device for a transaction identifier and, responsive to said request, transmitting a transaction identifier to the first mobile computing device over the communications network; a second module for receiving an HTTP request, including the unique transaction identifier, from a second mobile computing device, and, responsive to said request, transmitting program code to the second mobile computing device via HTTP over the communications network, wherein the program code is configured for requesting authorization from a user of the second mobile computing device to acquire position data, and, responsive to receiving authorization from the user, reading position data of the second mobile computing device and transmitting the position data and the transaction identifier to the application server via HTTP over the communications network; and a third module for receiving position data and the transaction identifier from the second mobile computing device and, responsive to receiving said data, transmitting the position data to the first mobile computing device over the communications network.

BRIEF DESCRIPTION OF THE DRAWINGS

The accompanying drawings, which are incorporated in and constitute a part of this disclosure, illustrate various example embodiments. In the drawings:

FIG. 2 is a diagram showing the data flow of the process for communicating position data over a communications network, according to an example embodiment;

DETAILED DESCRIPTION

Figure 1:
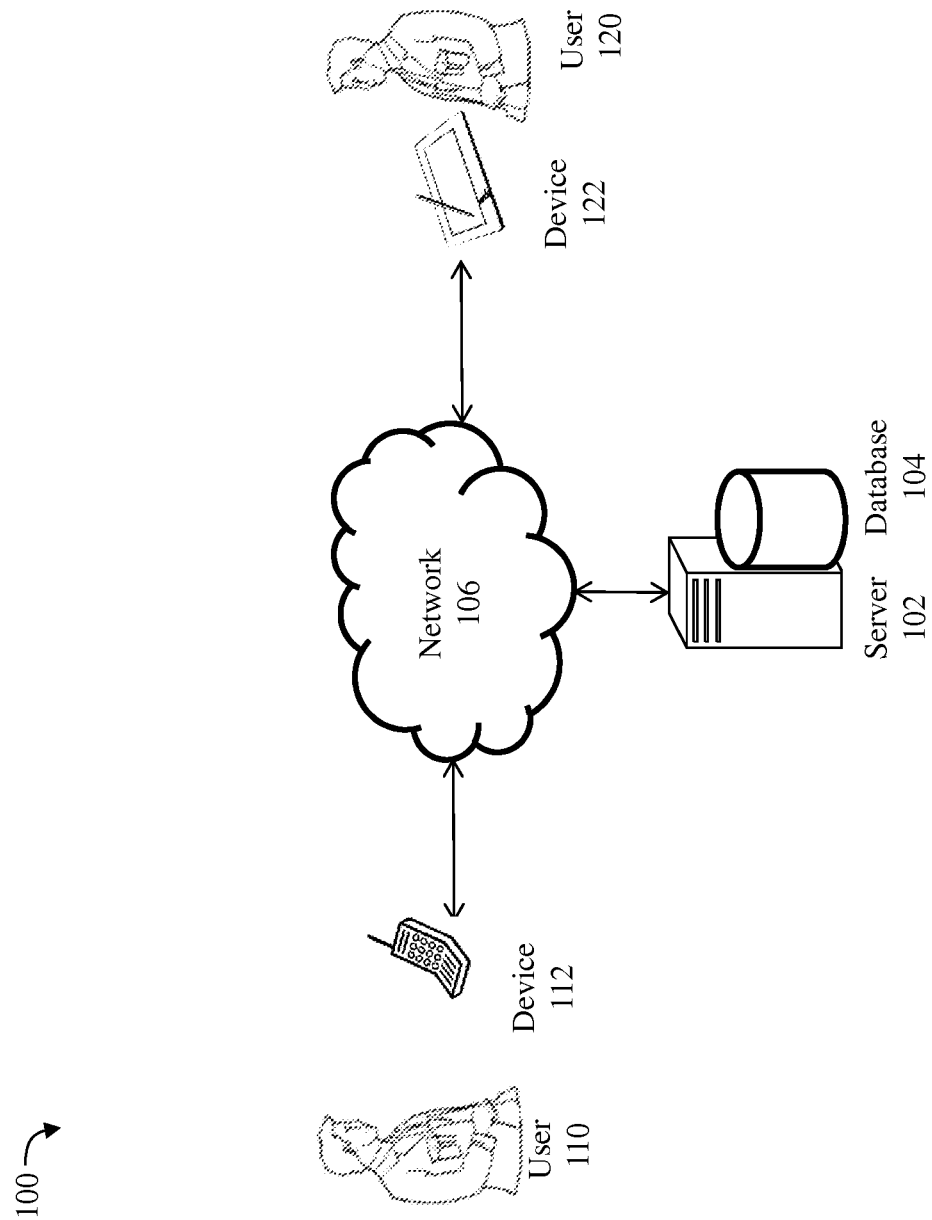
FIG. 1 is a block diagram of an operating environment that supports a process for facilitating the communication of position data over a communications network, according to an example embodiment.

The example embodiments described herein improve upon the problems with the prior art by providing a system, method and computer program product for allowing the quick and easy transmission of position data over a telecommunications network. Position data refers to location data, such as Global Positioning System (GPS) coordinates, an alphanumeric mailing address or map address, etc. The example embodiments allows individuals to utilize well-known and widely available tools, such as Short Message Service (SMS) and web browsers, on their respective mobile computing devices (cell phones, smart phones, tablet computers, etc.) to communicate position data in a fast and user-friendly manner. The example embodiments leverage the wide availability of mobile computing devices and mobile broadband network connections in modem society.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

FIG. 1 is a block diagram of an operating environment 100 that supports a process for facilitating the communication of position data over a communications network 106, according to an example embodiment. The environment 100 may comprise mobile computing devices 112 and 122, which may communicate with server 102 via a communications network 106. Mobile computing devices 112, 122 may comprise cellular telephones, smart phones, handheld computers, laptop computers or tablet computers, and each mobile computing device 112, 122 is operated by an individual user 110, 120, respectively. Mobile computing devices 112, 122 may also comprise other computing devices such as desktop computers, workstations, and game consoles, for example. The mobile computing devices 112, 122 may be connected either wirelessly or in a wired or fiber optic form to the communications network 106. Communications network 106 may be a packet switched network, such as the Internet, or any local area network, wide area network, enterprise private network, cellular network, phone network, mobile communications network, or any combination of the above.

Server 102 may be an application server or a web server that includes a software engine that delivers applications, data, program code and other information to networked devices 112, 122. The software engine of server 102 may perform other processes such as transferring data in a stream of packets that are interpreted and rendered by a software application as the packets arrive. FIG. 1 further shows that server 102 includes a database or repository 104, which may be a relational database comprising a Structured Query Language (SQL) database stored in a SQL server. Mobile computing devices 112, 122 may also each include databases. The database 104 may serve position data, as well as related information, used by server 102 and mobile computing devices 112, 122 during the course of operation of the invention.

Server 102 and mobile computing devices 112, 122 may each include program logic or computer program code comprising computer source code, scripting language code or interpreted language code that perform various functions of the present invention. In one embodiment, the aforementioned program logic may comprise program module 407 in FIG. 4. It should be noted that although FIG. 1 shows only two mobile computing devices and one server, the system of the present invention supports any number of servers and mobile computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

Environment 100 may be used when a mobile computing device 112 requests position data from mobile computing device 122 via server 102. Various types of data may be stored in the database 104 of server 102. For example, the database 104 may store one or more records for each transaction comprising the transmission of location data from one mobile computing device to another, i.e., a transaction record. A transaction record may include a transaction identifier (comprising a unique identifier for the transaction), position data (such as latitude and longitude coordinates, an altitude coordinate, an alphanumeric mailing address or street address, an alphanumeric map address, or the like) of one or more mobile computing devices, a timestamp, a unique identifier for one or more devices, a telephone number for one or more devices, an accuracy parameter (specifying the accuracy of position data within a predefined distance measurement, such as within one meter resolution), the name of one or more users, unique identifiers for one or more users, an accuracy parameter for one or more users or devices, and a quality parameter for one or more users or devices.

Figure 3A:
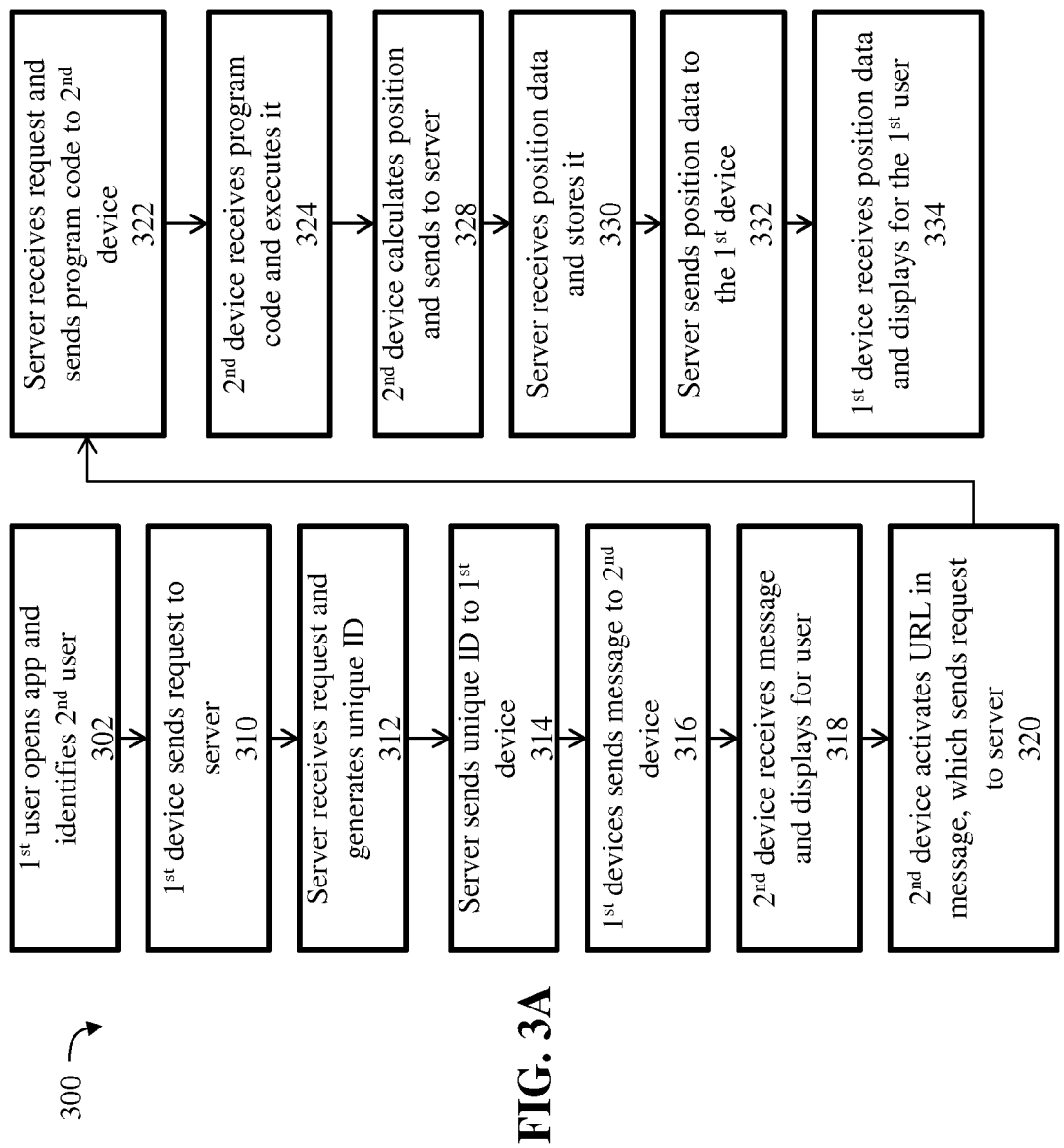
FIG. 3A is a flow chart showing the control flow of the process for communicating position data over a communications network, according to an example embodiment.

The process of the present invention will now be described with reference to FIG. 3A, which is a flow chart showing the control flow of the process for communicating position data over the communications network 106, according to an example embodiment. Note that FIG. 2 is described with reference to FIG. 2, which is a block diagram 200 illustrating the data flow for a system for communicating position data over the communications network 106. Process 300 describes the steps that occur when a user 110 requests current position data from the user 120 over the network 106.

Process 300 starts with step 302 wherein the user 110 of device 112 opens an application, such as a mobile application, on the device 112 in order to request position data from another user, such as user 120. An application, program code, and computer program product all refer to computer readable instructions, data structures, program modules, or other data that are executed or interpreted at run-time by a processor of a computer. A mobile application refers to an application that operates on a mobile computing device. The application opened on the device 122 may comprise an SMS text message interface, a web browser or a standalone application that was previously downloaded by the user 110 on device 112, such as an app. Next, the user 110 interacts with the interface to specify the user 120 from which the position shall be requested. This may comprise the user 110 entering a telephone number, an email address, a unique identifier or the like. Alternatively, the user 110 may select the user 120 from a list of contacts, from a social network interface, or the like. Upon specifying the user 120, the application may read any of the following data: the phone number of the device 122, the name of the user 120, a unique identifier for the user 120, a unique identifier for the device 122, etc.

In another embodiment, in step 302, the user 110 may specify an accuracy parameter, which defines the accuracy of position data within a predefined distance measurement, such as within one meter resolution. The accuracy parameter may be a single numeric value, a numeric value together with a unit of measurement (such as meters or inches), a range of numeric values, two numeric values that define a range, or any combination of the above. The user 110 may specify an accuracy parameter by entering the parameter via keyboard input, voice input, or by selecting from a list or dropdown menu. In another embodiment, the accuracy parameter is hardcoded in the mobile application executing on device 112.

Next, in the step 310, the device 112 sends a request 202 to the server 102 for a unique transaction identifier. The request 202 may be an HTTP request, an SMS text message, a SIP call, or the like. In one embodiment, the steps 302 and 310 may comprise an initiation module 352 (see FIG. 3B), wherein a module is a collection of computer instructions or computer program code. The request 202 may include additional data, such as the phone number of the device 112 or the device 122, the name of the user 110 or user 120, a unique identifier for the user 110 or the user 120, a unique identifier for the device 112 or the device 122, the current time and date at the device 112, the accuracy parameter specified at the device 112, the platform, version or operating system of device 112 or device 122, etc.

In step 312, the server 102 receives the request and generates a unique transaction identifier 204, which may be a unique alphanumeric value. Also in step 312, the server 102 generates a new transaction record and saves the unique transaction identifier in the transaction record, which is stored in the database 104. The server 102 may also save additional data in the transaction record, such as any of the data in the request 202, the current time and date, etc. In step 314, the server 102 sends the transaction identifier 204 to the device 112 via an HTTP request, an SMS text message, a SIP call, or the like. In one embodiment, the steps 312 and 314 may comprise a first module 362 in server 102.

In step 316, the device 112 receives the transaction identifier 204 and subsequently the device 112 sends a message 206 to the device 122 via the network 106, wherein the message 206 includes a Uniform Resource Locator (URL) and the transaction identifier 204. The message 206 may be an SMS text message or an email message. The message 206 may also include other data, such as any of the data present in request 202. In one embodiment, the step 316 may comprise a request module 354 in device 112.

In step 318, the device 122 receives the message 206 and displays it in an interface for the user 120 of device 122. Thus, the user 120 is notified that the user 110 is requesting the position data of user 120. In one embodiment, the interface prompts the user 120 to click on the URL in the message 206 to start the process of acquiring the position data of the device 122 and transmitting it to the user 110. In step 320, responsive to a request from the user 120 (which may be a click on the URL or another user command by the user 120), the device 122 activates the URL of message 206, which generates a request 208 (similar to request 202) to be generated by device 122 and transmitted to the server 102 via network 106. The request 208 may include transaction identifier 204 and may request program code to acquire the position data of the device 122 and transmit it to the server 102. The request 208 may also include other data, such as any of the data present in request 202. In one embodiment, the steps 318 and 320 may comprise a first receiving module 356 of device 112.

In one alternative, in step 320, responsive to a request from the user 120, the device 122 activates the URL of message 206, which opens or displays an interface, such as a web browser, that spawns an HTTP request comprising the request 208.

In step 322, the server 102 receives the request 208 and responds by accessing program code 210 and transmitting program code 210 to the device 122 via network 106. The program code 210 may be transmitted via HTTP, for example. In another embodiment, in step 322, the server 102 receives the request 208, reads the transaction identifier 204 in request 208 and accesses the transaction record in database 104 corresponding to the transaction identifier 204. Consequently, the server 102 stores additional data in the transaction record, such as program code 210, any of the data included in request 208 and the current date and time calculated at server 102. The program code 210 is configured to execute a variety of instructions, as described below. In one embodiment, the step 322 may comprise a second module 364 of server 102.

In one embodiment, the program code 210 comprises HTML code, CSS code, JavaScript, and/or a JavaScript Object notation (JSON) representation of a transaction object. In another embodiment, in step 322, when the server 102 receives the request 208, reads the transaction identifier 204 in request 208 and accesses the transaction record in database 104 corresponding to the transaction identifier 204, the server 102 reads the accuracy parameter in the transaction record. In this embodiment, the server 102 embeds the accuracy parameter in program code 210, such as in the form of a parameter or argument in a function call, or server 102 sends the program code 210 to the device 122 along with the accuracy parameter. In another embodiment, the server 102 transmits program code 210 to the device 122 in addition to other data, such as any of the data present in request 202.

In step 324, the device 122 receives the program code 210 and executes the program code 210. In one embodiment, an interface is generated and displayed in device 122 that prompts the user 120 for authorization to acquire the current position of the device 122. The interface may be a window or other graphical user interface that prompts the user 120 to click on a button or other field to explicitly provide his authorization. The interface may be generated and displayed by the program code 210 or generated and displayed by other program code that was already present on the mobile device 122 and routinely prompts the user 120 for authorization when any application running on the device 122 seeks to acquire the current position of the device 122. Responsive to input from the user 120 (which may be a click on the interface or another user command by the user 120), the device 122 proceeds to acquire the current position of device 122.

In step 328, the mobile computing device 122 calculates its current position (e.g., current position data 212) and transmits it to the server 102. In one embodiment, the device 122 calculates its current position (e.g., current position data 212) using a Global Positioning System (GPS) receiver, which is a navigation device that receives GPS signals for the purpose of determining the device's current position on Earth. A GPS receiver, and its accompanying processor, may calculate latitude, longitude and altitude information. In this embodiment, a radio frequency signal is received from a GPS transmitter (such as a satellite) comprising a time the signal was transmitted and a position of the transmitter. Subsequently, the device 122 calculates current position data 212 of the device 122 based on the signal. In another embodiment, the device 122 calculates its current position using alternative services, such as control plan locating, cell phone tower triangulation, GSM localization, dead reckoning, or any combination of the aforementioned position services. In one embodiment, the steps 324 and 328 may comprise a processing module 358 of device 112.

In one alternative, upon calculating its current position data 212, the device 122 opens and/or displays an interface, such as a web browser, that displays the current position data 212 in a map. In yet another embodiment, the device 122 also calculates its current compass heading (such as via the use of a compass application) and transmits this data to the server 102 over network 106. In another alternative, the current position data 212 is transmitted to the server 102 along with other data, such as any of the data present in request 202, the current time and date calculated at the server 102, etc. Position data 212 may be transmitted to the server 102 via SMS text, HTTP request, SIP call or the like.

In an embodiment where the server 102 sends the program code 210 to the device 122 along with an accuracy parameter, in step 328, the mobile computing device 122 calculates its current position data 212 according to the accuracy parameter (i.e., within the accuracy or precision range specified by the accuracy parameter) and transmits it to the server 102.

Next, in step 330, the server 102 receives the current position data 212 (and any other data transmitted by device 122) and accesses a transaction record in database 104 corresponding to the transaction identifier 204 included with position data 212. The server 102 stores the current position data 212, and any other data transmitted by device 122, in the transaction record. Then, in step 332, the server 102 transmits the position data 212 to the device 112. Along with the position data 212, in step 332, the server 102 may also include other data, such as the unique transaction identifier 204 or any data present in request 202. In one embodiment, the steps 330 and 332 may comprise a third module 366 of server 102. Position data 212 may be transmitted to the device 112 via SMS text, HTTP request, SIP call or the like.

Finally, in step 334, the device 112 receives the position data 212, opens and/or displays an interface, such as a web browser, and displays the position data 212 for the user 110, such as on a map, so as to illustrate the current location of the user 120. In one embodiment, the step 334 may comprise a second receiving module 360 of device 112.

Figure 3B:
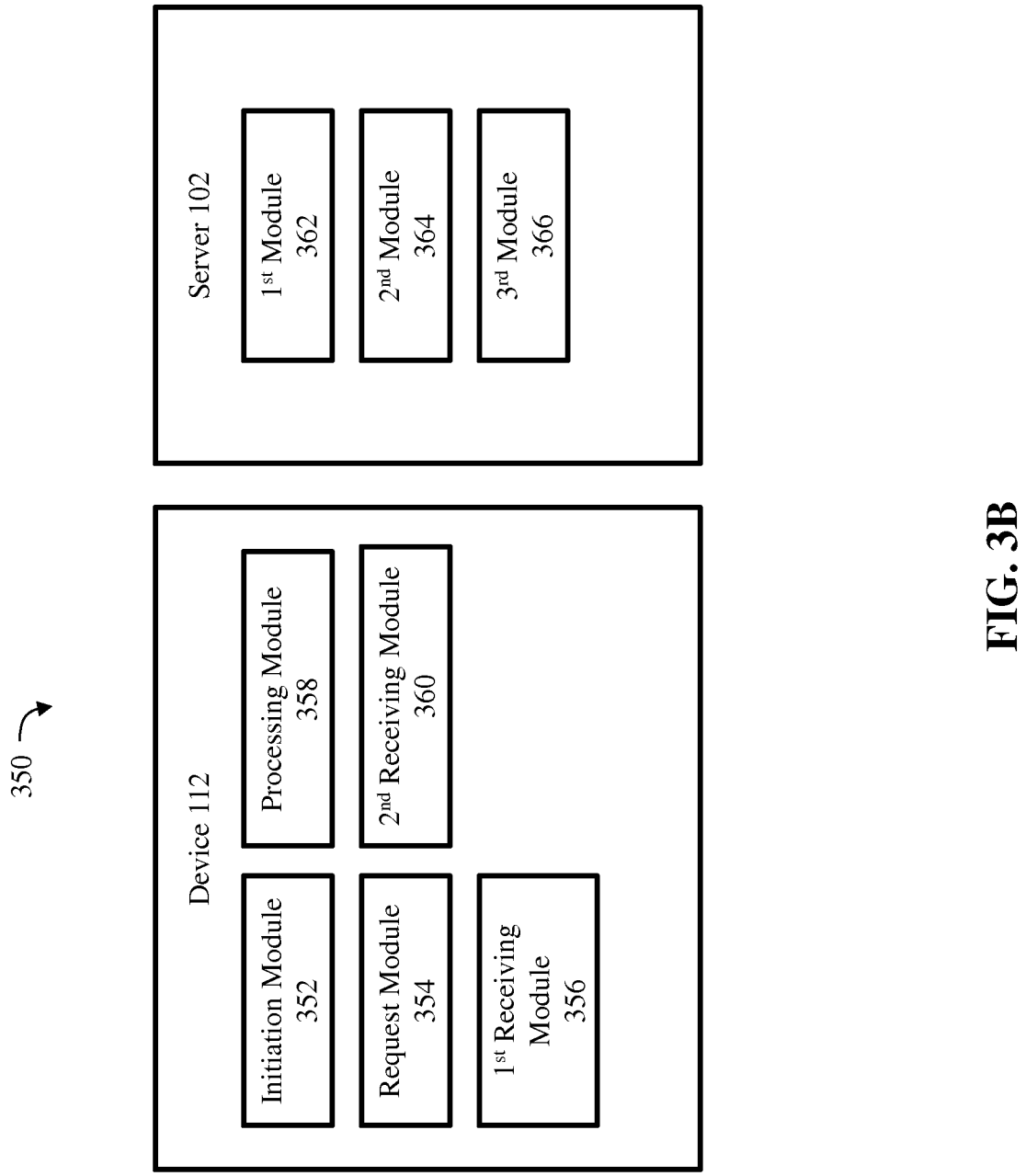
FIG. 3B is a block diagram showing the various functional modules of a mobile computing device and a server for communicating position data over a communications network, according to an example embodiment.

FIG. 3B is a block diagram 350 showing the various functional modules of the mobile computing device 112 and the server 102, for communicating position data over a communications network, according to an example embodiment. The block diagram 350 shows that the device 112, as well as device 122, may include the initiation module 352, the request module 354, the $1^{st}$ receiving module 356, the processing module 358 and the $2^{nd}$ receiving module 360, all of which are described in greater detail above. The block diagram 350 also shows that the server 102 may include the $1^{st}$ module 362, the $2^{nd}$ module 364, and the $3^{rd}$ module 366, all of which are also described in greater detail above.

Figure 4:
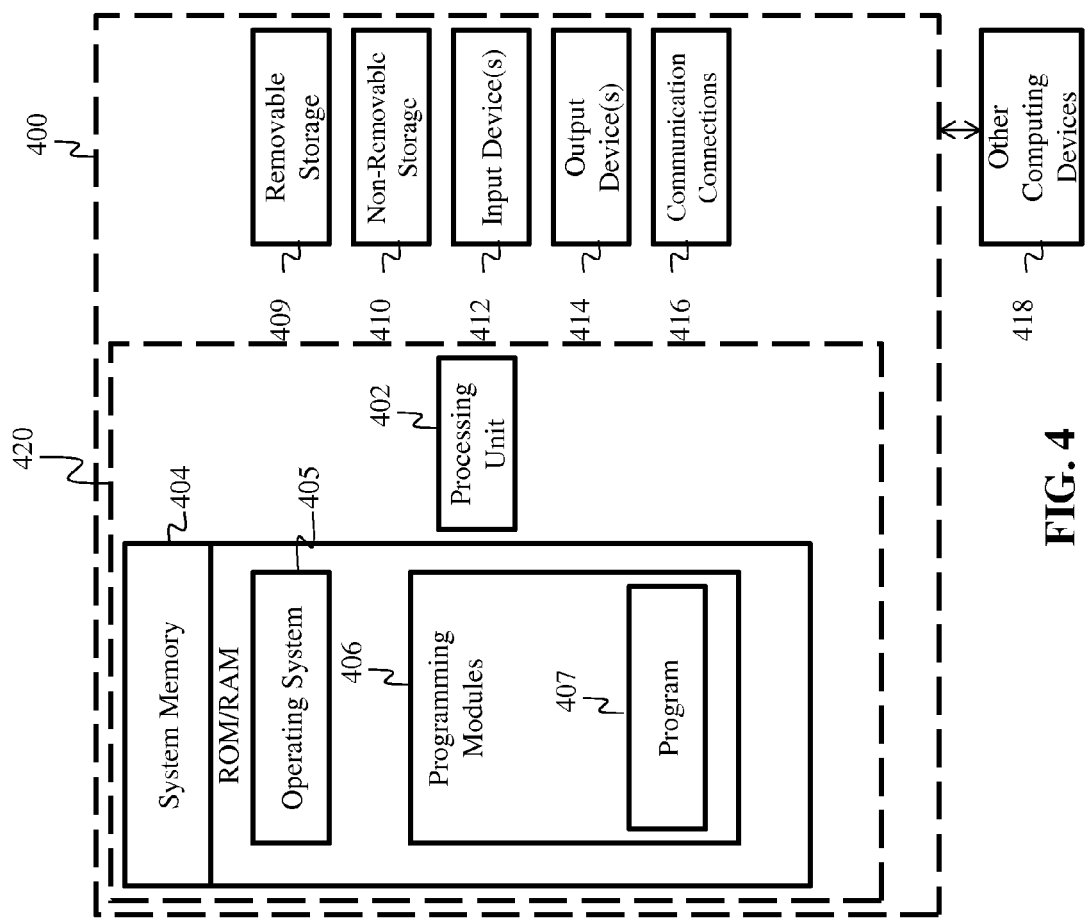
FIG. 4 is a block diagram of a system including a computing device, according to an example embodiment.

FIG. 4 is a block diagram of a system including an example computing device 400 and other computing devices. Consistent with the embodiments described herein, the aforementioned actions performed by server 102 and devices 112, 122 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for data flows and processes 200 and 300, as described above. Data flows and processes 200 and 300 may operate in other environments and are not limited to computing device 400.

With reference to FIG. 4, a system consistent with an embodiment of the invention may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination or memory. System memory 404 may include operating system 405, and one or more programming modules 406. Operating system 405, for example, may be suitable for controlling computing device 400's operation. In one embodiment, programming modules 406 may include, for example, a program module 407 for executing the actions of server 102, and/or devices 112, 122. Furthermore, embodiments of the invention may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 (e.g. program module 407) may perform processes including, for example, one or more of the stages of the data flows and processes 200, 400 as described above. The aforementioned processes are examples, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile application on a mobile computing device connected to a communications network, comprising:
    an initiation module for transmitting a request for a transaction identifier to an application server over the communications network and, responsive to said request, receiving a transaction identifier from the application server;
    a request module for transmitting to a second mobile computing device an SMS message, including a URL containing the transaction identifier, over the communications network;
    a first receiving module for receiving an SMS message and activating a URL embedded in the SMS message in response to a user command, wherein upon activation of the URL, the first receiving module is further configured for transmitting an HTTP request, including the transaction identifier, to the application server over the communications network;
    a processing module for receiving program code from the application server via HTTP, responsive to said HTTP request, and executing the program code, which is configured for reading position data of the mobile computing device and transmitting the position data and the transaction identifier to the application server via HTTP over the communications network; and
    a second receiving module for receiving position data of the second mobile computing device and displaying the position data.

2. The mobile application of claim 1, wherein the first receiving module is further configured for displaying an interface for the user of the mobile computing device, wherein the interface prompts the user for authorization to activate the URL embedded in the SMS message.

3. The mobile application of claim 2, wherein the processing module is further configured for requesting authorization from a user of the mobile computing device to transmit position data, wherein the processing module displays an interface that prompts the user for authorization to acquire position data of the mobile computing device.

4. The mobile application of claim 3, wherein the program code is further configured for displaying a map including the position data of the mobile computing device.

5. The mobile application of claim 4, wherein the second receiving module is further configured for receiving a timestamp associated with the position data of the second mobile computing device.

6. An application executing on an application server connected to a communications network, comprising:
- a first module for receiving a request from a first mobile computing device for a transaction identifier and, responsive to said request, transmitting a transaction identifier to the first mobile computing device over the communications network,
- a second module for receiving an HTTP request, including the unique transaction identifier, from a second mobile computing device, and, responsive to said request, transmitting program code to the second mobile computing device via HTTP over the communications network, wherein the program code is configured for requesting authorization from a user of the second mobile computing device to acquire position data, and, responsive to receiving authorization from the user, reading position data of the second mobile computing device and transmitting the position data and the transaction identifier to the application server via HTTP over the communications network; and
- a third module for receiving position data and the transaction identifier from the second mobile computing device and, responsive to receiving said data, transmitting the position data to the first mobile computing device over the communications network.

7. The application of claim 6, wherein the first module is further configured for generating and storing a transaction record that includes a unique identifier for the first mobile computing device, and the transaction identifier.

8. The application of claim 7, wherein the second module is further configured for accessing the transaction record according to the transaction identifier in the HTTP request and storing in the transaction record a unique identifier for the second mobile computing device.

9. The application of claim 8, wherein the third module is further configured for accessing the transaction record according to the transaction identifier received from the second mobile computing device and storing the position data of the second mobile computing device in the transaction record.

10. The application of claim 9, wherein the third module is further configured for generating a timestamp associated with the position data and the transaction identifier received from the second mobile computing device and, responsive to receiving said data, transmitting the timestamp and the position data to the first mobile computing device over the communications network.

* * * * *